(12) United States Patent
Yang et al.

(10) Patent No.: US 8,166,494 B2
(45) Date of Patent: Apr. 24, 2012

(54) ELECTRONIC DEVICE HAVING OPTICAL DISC DRIVE

(75) Inventors: Xin Yang, Shenzhen (CN); Wei Wu, Shenzhen (CN); Hua Zhang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 424 days.

(21) Appl. No.: 12/494,326

(22) Filed: Jun. 30, 2009

(65) Prior Publication Data

US 2010/0269125 A1 Oct. 21, 2010

(30) Foreign Application Priority Data

Apr. 21, 2009 (CN) .......................... 2009 1 0301720

(51) Int. Cl.
*G11B 33/02* (2006.01)
*G11B 17/043* (2006.01)
(52) U.S. Cl. ....................... 720/647; 720/655
(58) Field of Classification Search .................. 720/600, 720/601, 646, 647, 655
See application file for complete search history.

(56) References Cited

U.S. PATENT DOCUMENTS

| 5,963,528 | A  | * | 10/1999 | Fujimura et al. | 720/655 |
| 6,169,847 | B1 | * | 1/2001  | Mizoguchi et al. | 386/329 |
| 7,137,128 | B2 | * | 11/2006 | Shimada et al. | 720/601 |
| 7,453,689 | B2 | * | 11/2008 | Kim et al. | 361/679.55 |
| 7,755,882 | B2 | * | 7/2010  | Guo | 361/679.09 |
| 2005/0268314 | A1 | * | 12/2005 | Dai | 720/657 |
| 2006/0271944 | A1 | * | 11/2006 | Wang et al. | 720/644 |
| 2007/0124744 | A1 | * | 5/2007  | Nagata et al. | 720/643 |

FOREIGN PATENT DOCUMENTS

| JP | 58169365   | A | * | 10/1983 |
| JP | 63113969   | A | * | 5/1988  |
| JP | 2006134404 | A | * | 5/2006  |
| JP | 2006318608 | A | * | 11/2006 |

* cited by examiner

*Primary Examiner* — Will J Klimowicz
(74) *Attorney, Agent, or Firm* — Altis Law Group, Inc.

(57) ABSTRACT

An electronic device with a built-in optical disc drive includes a casing, an optical disc drive, a first gear rack, a driving mechanism, and a transmitting mechanism. The casing comprises an upper plate and a base, and the upper plate defines an opening. The optical disc drive comprises a tray and a tray cover, and the tray is disposed in the base and faced the opening, the tray cover covering the tray. The first gear rack is connected with the tray cover. The driving mechanism is movably disposed on the casing. The transmitting mechanism includes a first end and a second end, and the gear ratio of the second end to the first end is greater than 1. The first end is meshed with the driving mechanism and the second end is meshed with the first gear rack.

16 Claims, 6 Drawing Sheets

ELECTRONIC DEVICE HAVING OPTICAL DISC DRIVE

BACKGROUND

1. Technical Field

The present disclosure relates to electronic devices and, particularly, to an electronic device having an optical disc drive.

2. Description of Related Art

Electronic devices, such as laptop computers, typically include an optical disc drive. When an optical disc is to be used in the optical disc drive, a user activates a switch and a tray of the optical disc drive is partially ejected out of the optical disc drive. The user places the optical disc in the tray and activates the switch again and the tray is withdrawn back into the optical disc drive. One of the challenges of utilizing such an optical disc drive is that during the time the tray is ejected the tray may be damaged if inadvertently subjected to collision with a moving body, thereby shortening the service life of the optical disc drive.

What is needed, therefore, is an electronic device having an optical disc drive which can overcome the above-described problems.

DETAILED DESCRIPTION

Embodiments of the present disclosure will now be described in detail below, with reference to the accompanying drawings.

Figure 1:
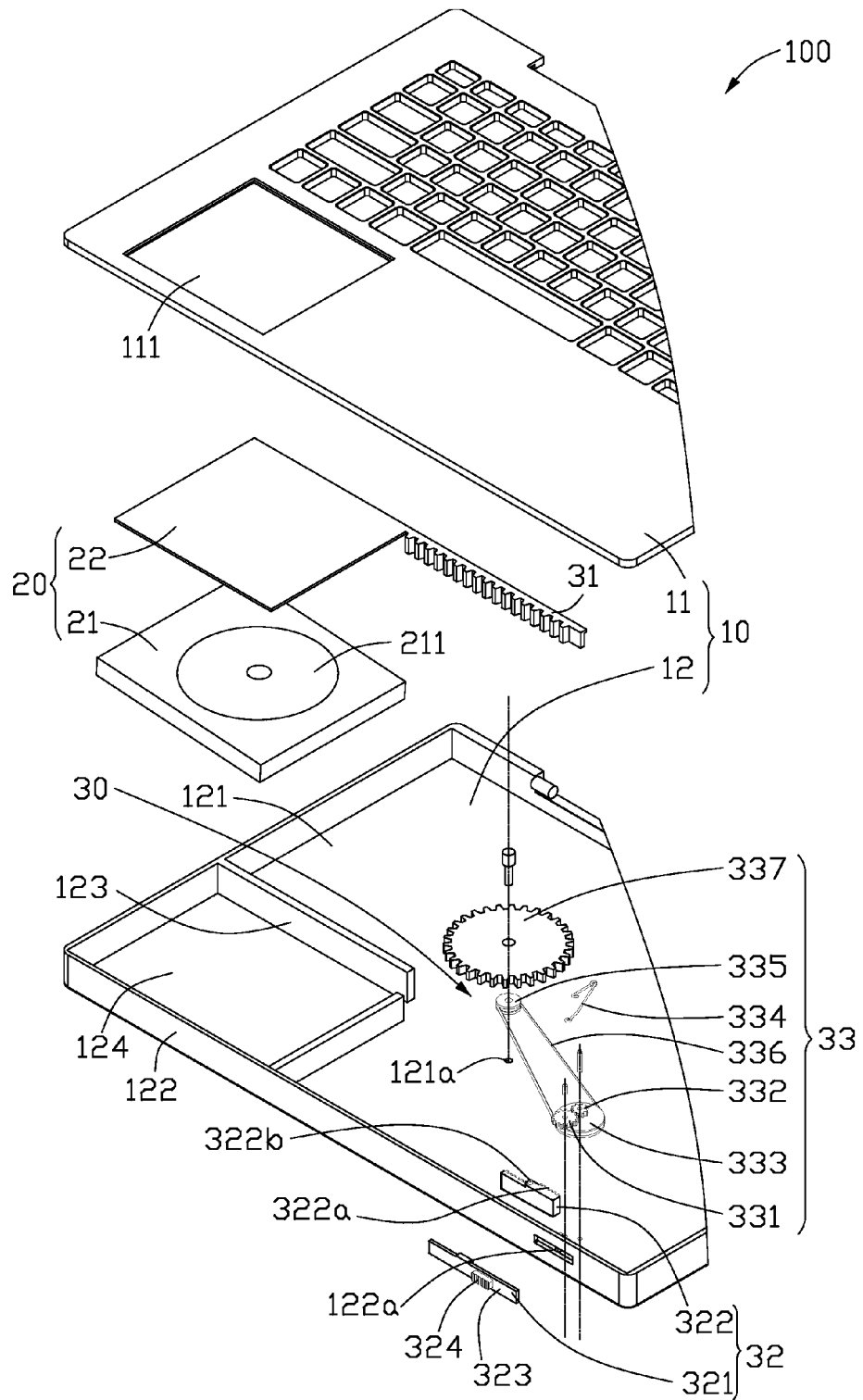
FIG. 1 is a partial, isometric, exploded view of an electronic device according to the first exemplary embodiment.
Figure 2:
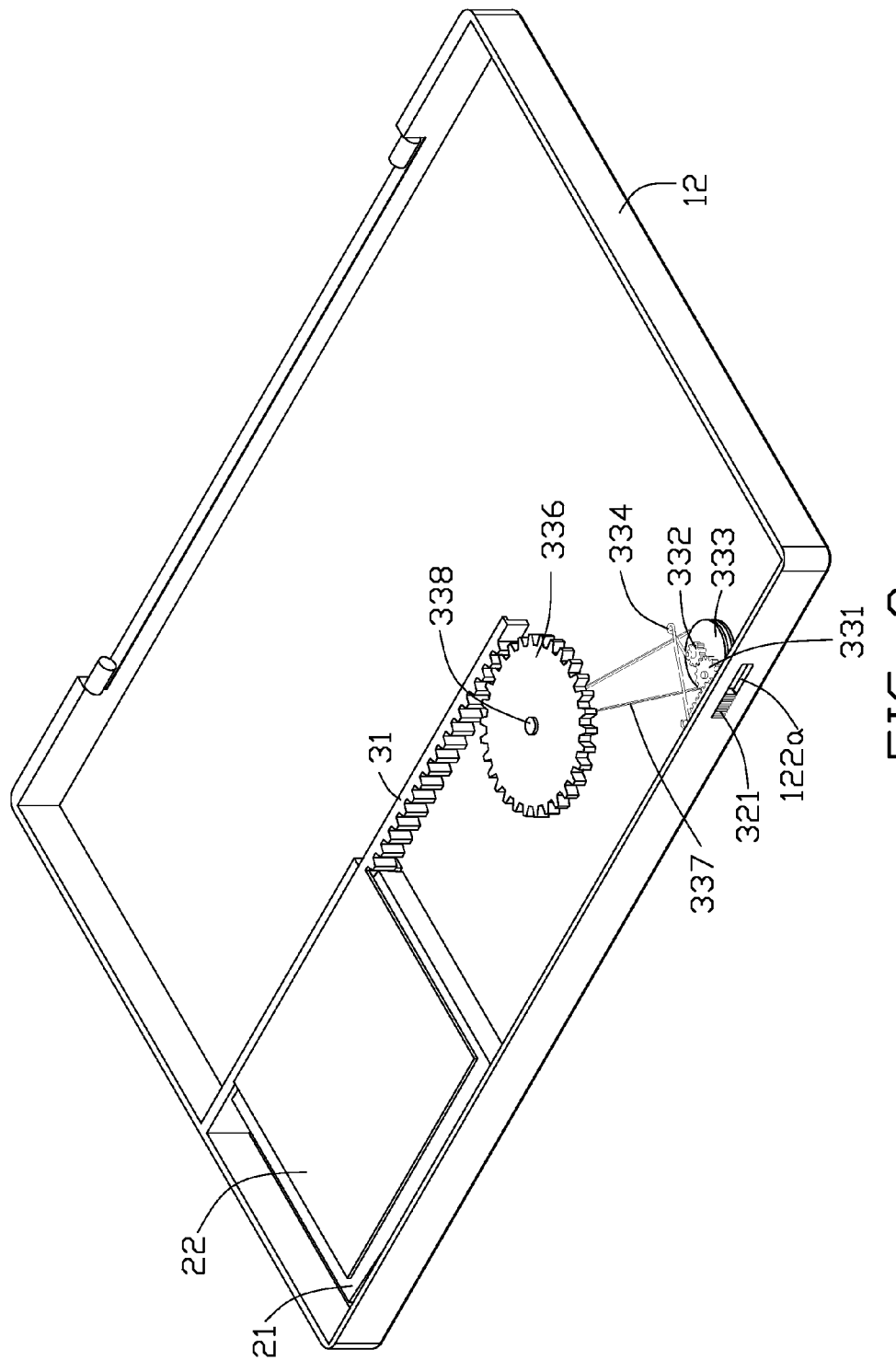
FIG. 2 is an isometric, assembled view of the electronic device of FIG. 1, which an upper plate thereof is revealed.
Figure 3:
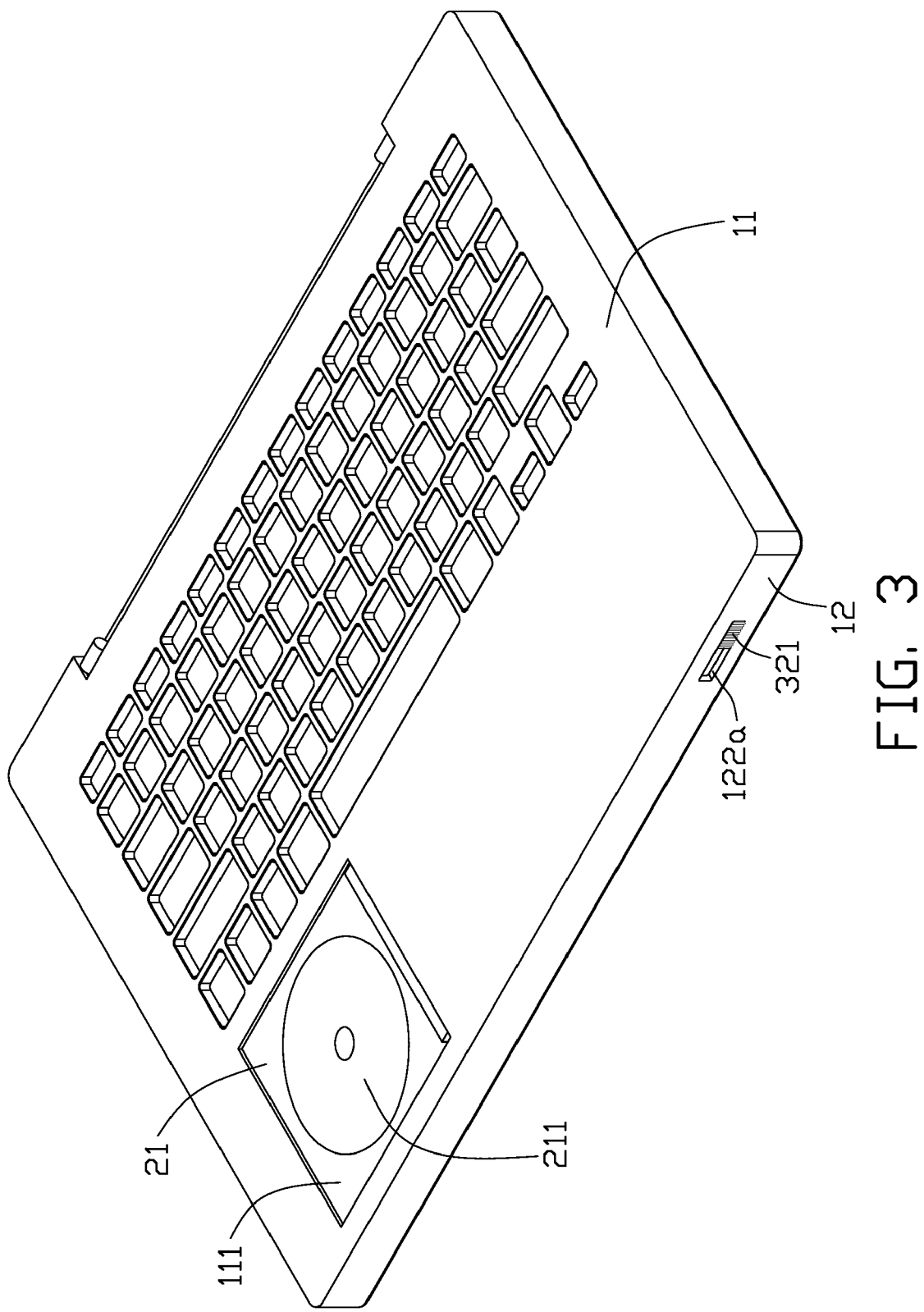
FIG. 3 is an isometric, assembled view of the electronic device of FIG. 1, where an optical disc drive thereof is opened.

Referring to FIGS. 1-3, an electronic device 100, according to a first exemplary embodiment, includes a casing 10, an optical disc drive 20, and an actuation assembly 30. In the present embodiment, the electronic device 100 is a notebook computer.

The casing 10 is cuboid in shape, and includes an upper plate 11 and a base 12. The upper plate 11 defines a rectangular opening 111 in a corner. The base 12 includes a bottom plate 121, four sidewalls 122, and two positioning blocks 123. The bottom plate 121 is similar to the upper plate 11 in shape (i.e., rectangular) and defines a number of blind holes 121a. The sidewalls 122 extend substantially perpendicular from four edges of the bottom plate 121. The positioning blocks 123 are elongated strips and disposed in the bottom plate 121. The two positioning blocks 123 are perpendicularly connected to two adjacent sidewalls 122 correspondingly. The positioning blocks 123 and two sidewalls 122 connected to the positioning blocks 123 cooperatively define a tray receiving space 124. One of the two sidewalls 122 (e.g., a front sidewall) defines a guide slot 122a. The guide slot 122a is positioned at an end of the sidewall 122 away from the tray receiving space 124 and extends along the length of the sidewall 122.

The optical disc drive 20 includes a tray 21 and a tray cover 22. The tray 21 is a rectangular panel with various required optical and electrical components installed, and defines a cavity 211 in a surface for receiving a disc. The tray cover 22 is a rectangular plate, and configured for covering the tray 21.

The actuation assembly 30 includes a first gear rack 31, a driving mechanism 32, and a transmitting mechanism 33.

The driving mechanism 32 includes a slide block 321 and a second gear rack 322. The slide block 321 is a strip plate, and includes a slide plate 323 and an operation block 324. The operation block 324 extends substantially perpendicular from the slide plate 323. The second gear rack 322 includes an upper surface 322a. The second gear rack 322 extends substantially perpendicular projects a projection 322b from the upper surface 322a.

The transmitting mechanism 33 includes a first gear 331, a second gear 332, a first driving wheel 333, a torsion spring 334, a second driving wheel 335, a belt 336, and a third gear 337. Each gear includes a gear portion and a rotatable shaft extends substantially perpendicular from the middle of the gear portion. In this embodiment, the gear ratio of the first gear 331 to the second gear 332 is greater than 1. The transmission ratio of the first driving wheel 333 to the second driving wheel 335 is greater than 1.

In assembly, the tray 21 is disposed in the tray receiving space 124 of the casing 10, and the cavity 211 is faced away from the bottom plate 121. One end of the first gear rack 31 is fixed to the tray cover 22. The length of the first gear rack 31 is substantially parallel to the front sidewall 122 and the gears of the first gear rack 31 face the guide slot 122a.

The slide block 321 is slidably latched in the guide slot 122a in a manner that the operation block 324 protrudes out of the base 12 from the guide slot 122a. The second gear rack 322 is fixed to the slide plate 323. The gears of the second gear rack 322 face the first gear rack 31.

The first gear 331 is disposed on the bottom plate 121 by rotatably placing the shaft into a corresponding blind hole 121a. The first gear 331 is meshed with the second gear rack 322 and can be driven to rotate by the second gear rack 322.

The second gear 332 is disposed on the bottom plate 121 by rotatably placing the shaft into a corresponding blind hole 121a. The second gear 332 is meshed with the first gear 321 and can be driven to rotate by the first gear 321.

The first driving wheel 333 is inserted in the shaft of the second gear 332, and aligned with the bottom plate 121.

The torsion spring 334 is a V-shaped spring. One end of the torsion spring 334 is fixed to the projection 322b, and another end is fixed to the shaft of the second gear 332.

The second driving wheel 335 is inserted in the shaft of the third gear 337, and aligned to the bottom plate 121.

The belt 336 is a circular cable. The belt 336 is looped around the first driving wheel 333 and the second driving wheel 335.

The third gear 337 is disposed on the bottom plate 121 by rotatably placing the shaft into a corresponding blind hole. The third gear 337 is meshed with the first gear rack 31 and can be driven to move by the third gear 337.

The upper plate 11 is placed and fixed to the base 12 to cover the base 12. The cavity 211 of the tray 21 faces the opening 111.

In operation, the tray cover 22 is in a position where the tray 21 is covered by the tray cover 22 when the optical disc drive 20 is in a close position. When used, a user can slide the slide block 321 along a direction away from the tray 21. As a result, the second gear rack 322 drives the first gear 331 to rotate counterclockwise. The second gear 332 is driven to rotate clockwise, and brings the first driving wheel 333 to rotate clockwise. The torsion spring 334 gives a circumferential force to rotate the second gear 332 clockwise. The first driving wheel 333 drives the second driving wheel 335 to rotate clockwise via the belt 336. Correspondingly, the second driving wheel 335 drives the third gear 337 to rotate clockwise. The third gear 337 drives the first gear rack 31 to move along a direction away from the tray 21. Thus, the tray cover 22 is moved away from the tray 21 exposing the opening 111. The optical disc drive 20 is in an open position. When closing the opening 111, the user can slide the slide block 321 along a direction close to the tray 21, and the tray cover 22 covers the opening 111.

Figure 4:
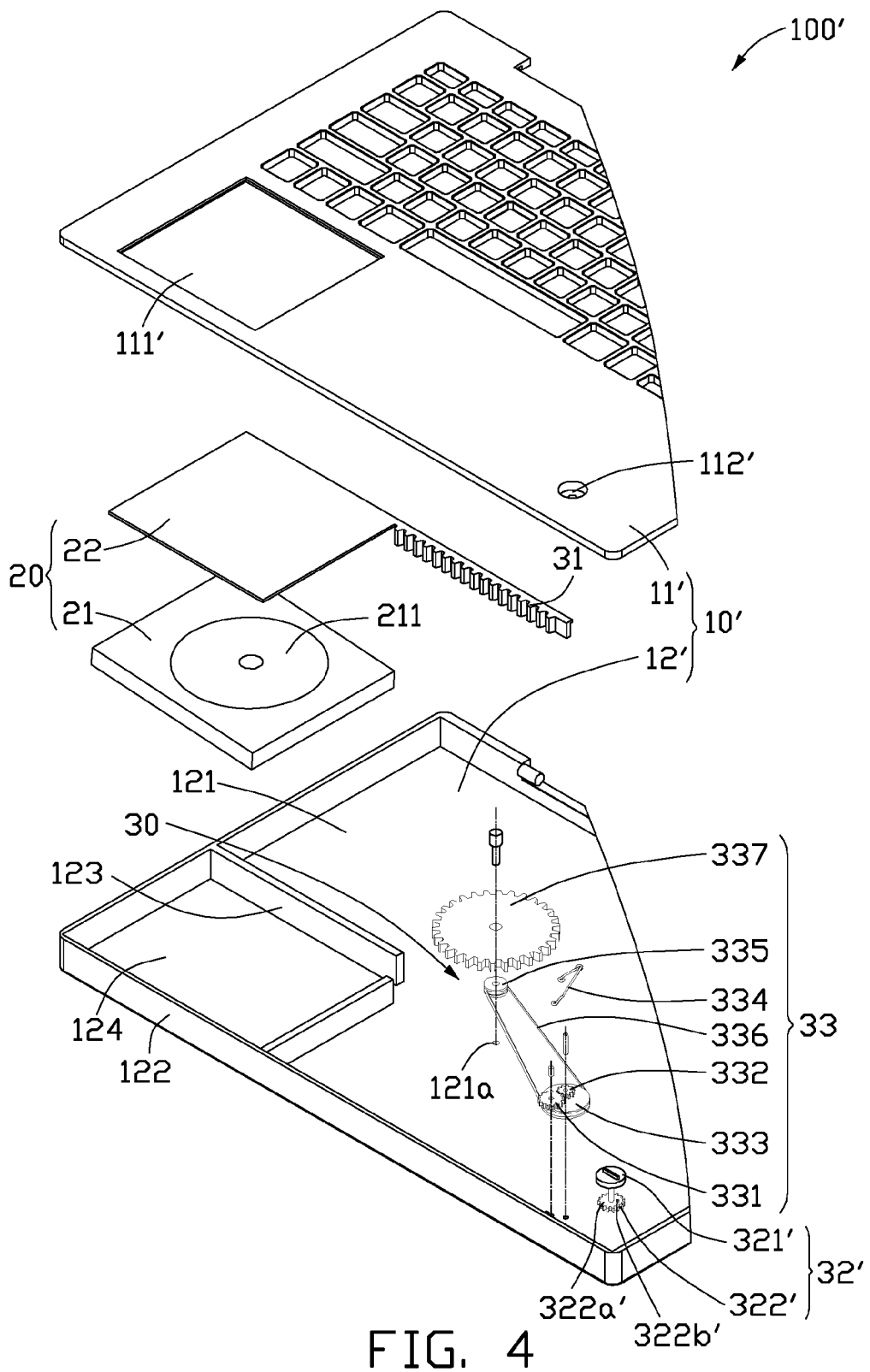
FIG. 4 is a partial, isometric, exploded view of an electronic device according to the second exemplary embodiment.
Figure 5:
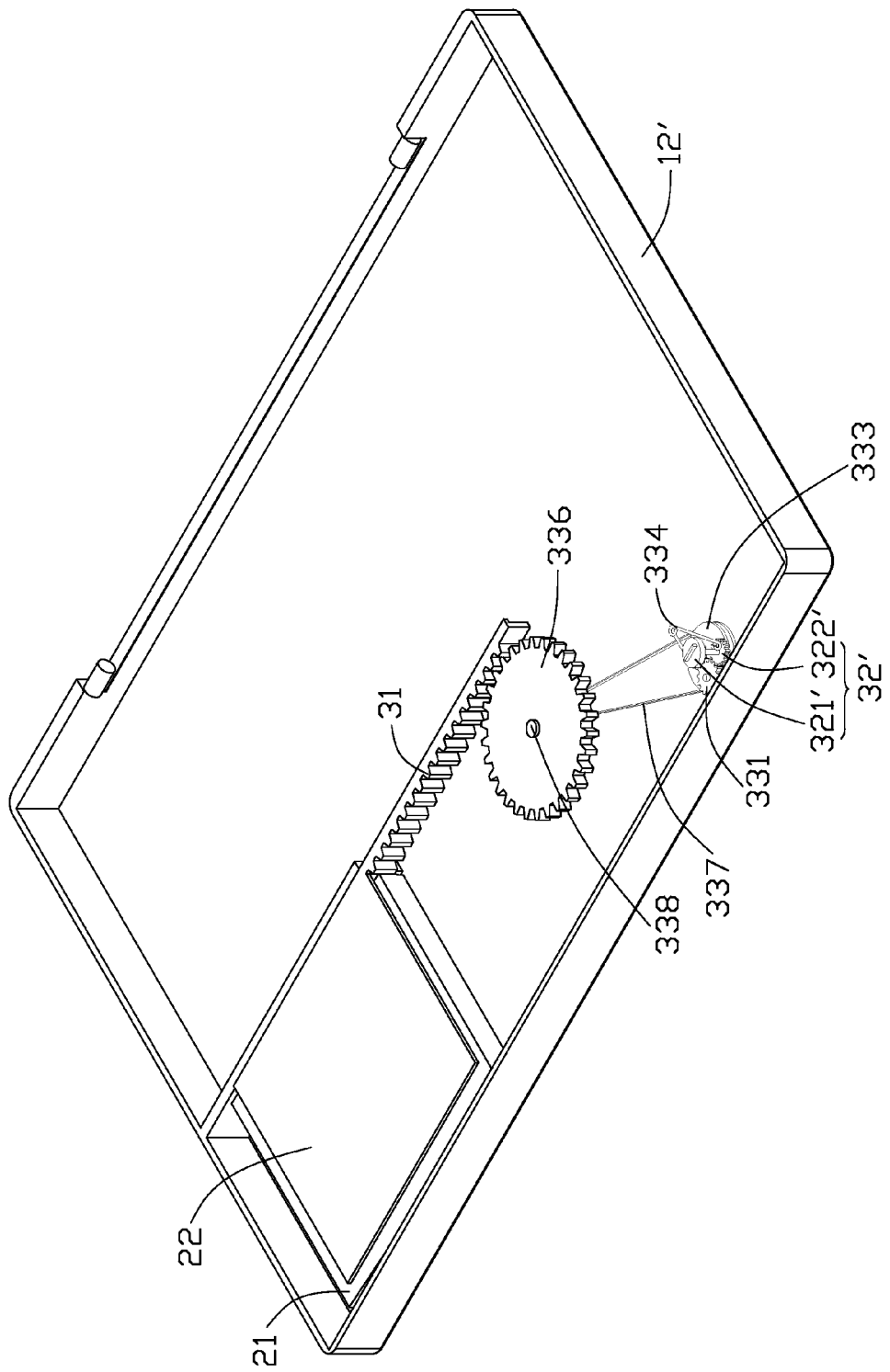
FIG. 5 is an isometric, assembled view of the electronic device of FIG. 4, which an upper plate thereof is revealed.
Figure 6:
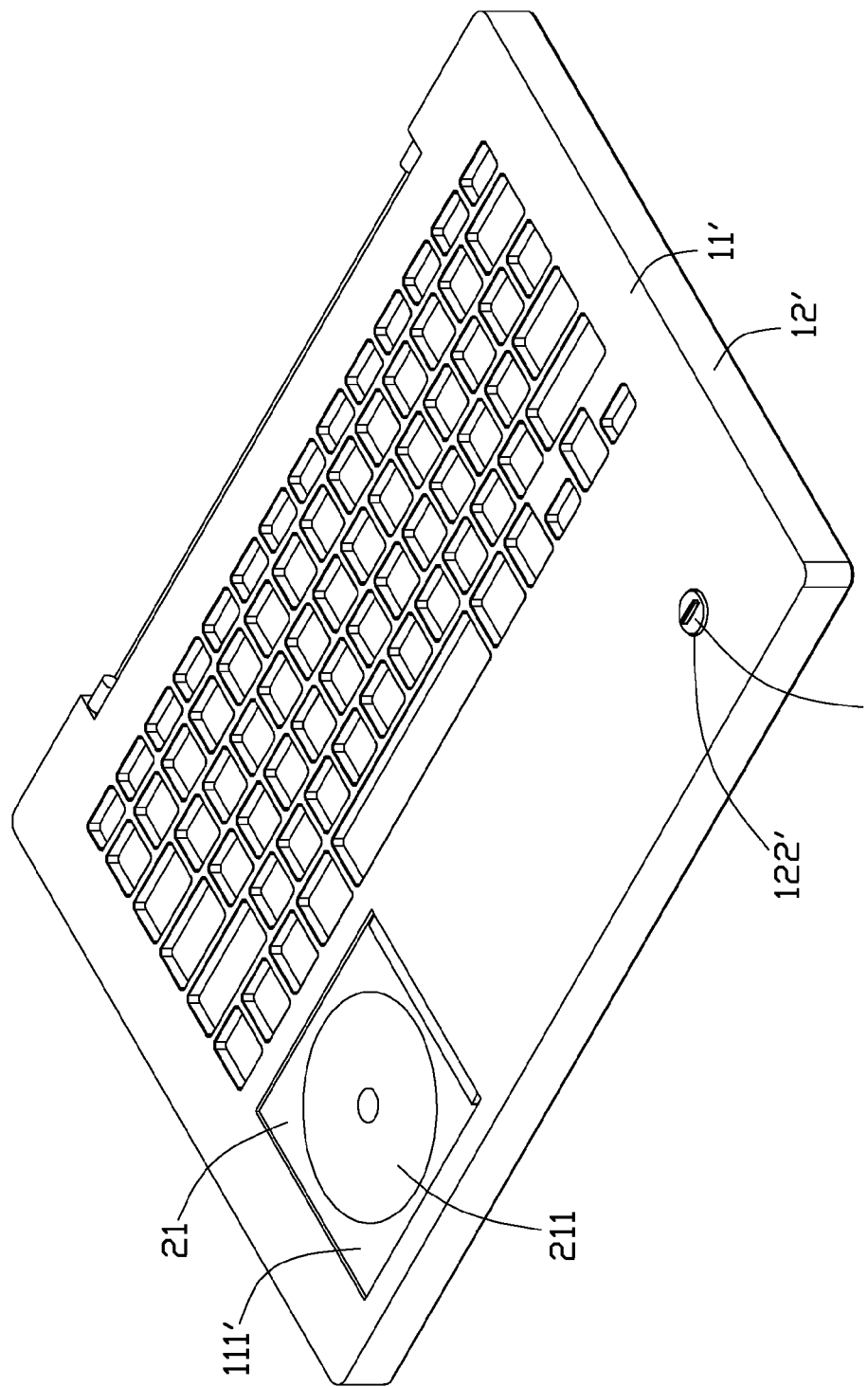
FIG. 6 is an isometric, assembled view of the electronic device of FIG. 4, where an optical disc drive thereof is opened.

Referring to FIGS. 4-6, an electronic device 100', according to a second exemplary embodiment is disclosed. The electronic device 100' is essentially similar to the electronic device 100 except the casing 10' and driving mechanism 32'. In this embodiment, the casing 10' includes an upper plate 11' and a base 12', the upper plate 11' defines an opening 111' and a stepped through hole 112'. In addition, the driving mechanism 32' includes a turning knob 321' and a driving gear 322'. The driving gear 322' includes an upper surface 322a' and a projection 322b' extends substantially perpendicular from the upper surface 322a'. The driving mechanism 32' is rotatably located in the stepped through hole 112'. The driving gear 322' is meshed with the first gear 331. One end of the torsion spring 334 is fixed on the projection 322b', and another end is fixed on the shaft of the second gear 332.

In operation, the user rotates the turning knob 321' clockwise. As a result, the driving gear 322' drives the first gear 331 to rotate counterclockwise. The second gear 332 is driven to rotate clockwise, and brings the first driving wheel 333 to rotate clockwise. The torsion spring 334 gives a circumferential force to rotate the second gear 332 clockwise. The first driving wheel 333 drives the second driving wheel 335 to rotate clockwise via the belt 336. Correspondingly, the second driving wheel 335 brings the third gear 337 to rotate clockwise. The third gear 337 drives the first gear rack 31 to move along a direction away from the tray 21. Thus, the tray cover 22 is moved away from the tray 21 exposing the opening 111'. The optical disc drive 20 is in an open position. When closing the opening 111', the user can rotate the turning knob 321' counterclockwise, and the tray cover 22 covers the opening 111'.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. An electronic device, comprising:
a casing comprising an upper plate and a base, the upper plate defining an opening;
an optical disc drive comprising a tray and a tray cover, the tray being fixedly disposed in the base and facing the opening; the tray cover covering the tray;
a first gear rack connected with the tray cover;
a driving mechanism movably disposed on the casing; and
a transmitting mechanism comprising a first end and a second end, the gear ratio of the second end to the first end being greater than 1, the first end being meshed with the driving mechanism and the second end being meshed with the first gear rack, wherein when the transmitting mechanism is activated by the driving mechanism through the first end, the transmitting mechanism drives the first gear rack through the second end, and causes the tray cover to slide away from the opening to expose the tray.

2. The electronic device as claimed in claim 1, wherein the base comprises a bottom plate and four sidewalls extending substantially perpendicular from the edge of the bottom plate, and the front sidewall defines a guide slot to slidably receive the driving mechanism.

3. The electronic device as claimed in claim 2, wherein the driving mechanism comprises a slide block and a second gear rack meshed with the first end of the driving mechanism, and the slide block slidably latches in the guide slot.

4. The electronic device as claimed in claim 3, wherein the transmitting mechanism comprises a first gear, a second gear, a first driving wheel, a torsion spring, a second driving wheel, a belt, and a third gear; and each gear comprises a gear portion and a rotating shaft extends substantially perpendicular from the middle of the gear portion.

5. The electronic device as claimed in claim 4, wherein the first gear, second gear, and the third gear are disposed on the bottom plate by rotatably placing the shaft into a corresponding blind hole; the first driving wheel is inserted in the shaft of the second gear; the second driving wheel is inserted in the shaft of the third gear; and the belt is looped around the first driving wheel and the second driving wheel.

6. The electronic device as claimed in claim 5, wherein the first gear is meshed with the second gear rack, and the third gear is meshed with the first gear rack.

7. The electronic device as claimed in claim 6, wherein the gear ratio of the first gear to the second gear is greater than 1; and the transmission ratio of the first driving wheel to the second driving wheel is greater than 1.

8. The electronic device as claimed in claim 2, wherein one end of the first gear rack is fixed to the tray cover, the length of the first gear rack is substantially parallel to the front sidewall and the gears of the first gear rack face the guide slot.

9. The electronic device as claimed in claim 5, wherein the torsion spring is a V-shaped spring, one end of the torsion spring is fixed to a projection projecting from an upper surface of the second gear rack, and another end of the torsion spring is fixed to the shaft of the second gear.

10. The electronic device as claimed in claim 1, wherein the base comprises a bottom plate and four sidewalls extending substantially perpendicular from the edge of the bottom plate, and the cover defines a stepped through hole to rotatably receive the driving mechanism.

11. The electronic device as claimed in claim 10, wherein the driving mechanism comprises a turning knob and a driving gear, the turning knob is rotatably located in the stepped through hole, and the driving gear is meshed with the first end of the driving mechanism.

12. The electronic device as claimed in claim 11, wherein the transmitting mechanism comprises a first gear, a second gear, a first driving wheel, a torsion spring, a second driving wheel, a belt, and a third gear; and each gear includes a gear portion and a rotating shaft extends substantially perpendicular from the middle of the gear portion.

13. The electronic device as claimed in claim 12, wherein the first gear, the second gear, and the third gear are disposed on the bottom plate by rotatably placing the shaft into a corresponding blind hole; the first driving wheel is inserted in the shaft of the second gear; the second driving wheel is inserted in the shaft of the third gear; and the belt is looped around the first driving wheel and the second driving wheel.

14. The electronic device as claimed in claim 13, wherein the first gear is meshed with the driving gear, and the third gear is meshed with the first gear rack.

15. The electronic device as claimed in claim 14, wherein the gear ratio of the first gear to the second gear is greater than 1; and the transmission ratio of the first driving wheel to the second driving wheel is greater than 1.

16. An electronic device, comprising:

a casing comprising an upper plate and a base, the upper plate defining an opening;

an optical disc drive comprising a tray and a tray cover, the tray being fixedly disposed in the base and facing the opening; the tray cover covering the tray;

a first gear rack connected with the tray cover; and a transmitting mechanism engaged with the first gear rack;

wherein when the transmitting mechanism is activated, the transmitting mechanism drives the first gear rack and causes the tray cover to slide away from the opening to expose the tray.

* * * * *